(12) United States Patent
Kreibig et al.

(10) Patent No.: US 9,751,030 B2
(45) Date of Patent: *Sep. 5, 2017

(54) FILTER AND FILTER ELEMENT PROVIDED THEREFOR

(75) Inventors: Micha Kreibig, Rehlingen-Siersburg (DE); Richard Eberle, Ormesheim (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 181 days.

This patent is subject to a terminal disclaimer.

(21) Appl. No.: 13/261,418

(22) PCT Filed: Mar. 2, 2011

(86) PCT No.: PCT/EP2011/001011
§ 371 (c)(1),
(2), (4) Date: Oct. 22, 2012

(87) PCT Pub. No.: WO2011/107262
PCT Pub. Date: Sep. 9, 2011

(65) Prior Publication Data
US 2013/0048554 A1    Feb. 28, 2013

(30) Foreign Application Priority Data

Mar. 4, 2010  (DE) .................. 10 2010 010 304

(51) Int. Cl.
  *B01D 29/00*   (2006.01)
  *B01D 29/23*   (2006.01)
  (Continued)

(52) U.S. Cl.
  CPC ............ *B01D 29/23* (2013.01); *B01D 35/005* (2013.01); *B01D 35/153* (2013.01); *B01D 35/16* (2013.01);
  (Continued)

(58) Field of Classification Search
  CPC ...... B01D 29/15; B01D 29/58; B01D 35/005; B01D 35/153; B01D 35/16; B01D 36/003;
  (Continued)

(56) References Cited

U.S. PATENT DOCUMENTS 3,312,350 A *    4/1967  Kasten .......................... 210/307
2008/0135469 A1*  6/2008  Fremont et al. .............. 210/234

FOREIGN PATENT DOCUMENTS

DE          100 64 482 A1   7/2002
DE    10 2006 060 129 A1   6/2008
(Continued)

*Primary Examiner* — Patrick Orme
(74) *Attorney, Agent, or Firm* — Wenderoth, Lind & Ponack, L.L.P.

(57) ABSTRACT

A filter, in particular for fluids polluted by admixtures of water, such as diesel oil, includes a filter housing (1) receiving at least one filter element (9). During the filtering process, fluid can flow through the filter medium (11) from the outer unfiltered side (13) of the filter element into an inner filter cavity (17) forming the filtered side (19). A water passage (39) inside a pipe connector (35) of an end cap (23) forms a fluid path (51), which is separated from the other fluid path (55) that forms the connection between the inner filtered side (19) of the filter element (9) and a fluid outlet (37) of the housing (1) in the functional position of the filter element (9). The element receptacle (29) forms a through-passage (59) toward the water collecting chamber (31). Sealing assemblies (83, 87) located between the through-passage (59) and the pipe connection (35) of the end cap (23) delimit a connecting chamber (36) on the outside of the pipe connector (35). The connecting chamber connects the other fluid path (55) to the fluid outlet (37) of the housing (1).

15 Claims, 6 Drawing Sheets

(51) Int. Cl.
*B01D 35/153* (2006.01)
*B01D 35/16* (2006.01)
*B01D 36/00* (2006.01)
*B01D 35/30* (2006.01)
*B01D 35/00* (2006.01)
B01D 29/58 (2006.01)
B01D 29/11 (2006.01)
F02M 37/22 (2006.01)

(52) U.S. Cl.
CPC ........... *B01D 35/30* (2013.01); *B01D 35/306* (2013.01); *B01D 36/003* (2013.01); *F02M 37/22* (2013.01); B01D 29/117 (2013.01); B01D 29/58 (2013.01); B01D 2201/295 (2013.01); B01D 2201/305 (2013.01); B01D 2201/34 (2013.01); B01D 2201/4007 (2013.01); B01D 2201/4084 (2013.01); F02M 37/221 (2013.01)

(58) Field of Classification Search
CPC ........ B01D 2201/291; B01D 2201/295; B01D 2201/305; B01D 2201/34; B01D 2201/4007; B01D 2201/4084; F02M 37/22; F02M 37/221
USPC .................................................. 210/418, 435
See application file for complete search history.

(56) References Cited

FOREIGN PATENT DOCUMENTS

DE  10 2008 020 223 A1  9/2009
DE  10 2008 020 233 A1  10/2009

* cited by examiner

Fig.1  State of the Art

FILTER AND FILTER ELEMENT PROVIDED THEREFOR

FIELD OF THE INVENTION

The invention relates to a filter intended in particular for fluids, such as diesel oil, contaminated with water impurities. The filter comprises a filter housing in which at least one filter element can be accommodated. The filtration process flow through the filter medium of the filter element can take place from its outer unfiltered side into an inner filter cavity forming the filtered side. Between the unfiltered side and the inner filter cavity, a water separation device and a separation space is provided for separated water. The filter element on its lower end, which faces the bottom part of the filter housing, is enclosed by an end cap having a pipe connector as a passage for fluid emerging from the filter cavity forming the filtered side. A water passage at least partially surrounds the passage, is open to the separation space and can be secured on an element retainer of the filter housing located above a water collecting space located on the bottom of the filter housing. The element retainer forms a fluid outlet leading out of the housing for fluid emerging from the filtered side. The invention also relates to a filter element intended for use in such a fuel filter.

BACKGROUND OF THE INVENTION

Filters of the aforementioned type are known from the prior art. They are used, for example, in fuel systems for internal combustion engines to protect sensitive components, in particular injection systems, against degradation due to the water content entrained in the fuel.

The separation of the water content entrained in the fuel can be effected by a coagulation process. In that process, on the filter medium, water droplets are formed that can flow out of the separation space formed in the filter element to the water collecting space of the filter housing.

To ensure the operational reliability of the systems located downstream of the filter, processes of changing the filter element necessary over the service life are critical. Where the fluid connection between the filtered side of the filter element and the fluid outlet of the housing is interrupted when the end cap of the used filter element is decoupled from the element retainer, no contamination of the system by dirt attached to the used filter element falling off can occur.

SUMMARY OF THE INVENTION

An object of the invention is to provide an improved filter of the type under consideration whose construction ensures a maximum of operational reliability relative to the risk of contamination at the fluid outlet of the housing being avoided to the greatest extent possible in changing processes.

This object is basically achieved according to the invention by a filter having the end cap of the filter element specially designed such that its pipe connector forms separate inner fluid paths both for the cleaned fluid and for the separated water and can be accommodated in a through channel of the element retainer that is open toward the water collecting space. Between the outer side of the pipe connector and the element retainer, active seal arrangements delimit a connecting space such that the filtered-side inner filter cavity is connected to the fluid outlet of the housing in the operating position of the filter element.

In this construction, when a used filter element is removed from the element retainer, a continuous opening is formed so that dirt falling off the filter element falls past the filtered-side fluid outlet of the housing into the water collecting space.

An additional further advantage of the invention lies in the fact that for a filter element accommodated in the filter housing, the seal arrangements active between the through channel of the element retainer and the pipe connector of the end cap also effect sealing between the unfiltered side of the filter housing and the filtered side. Thus, providing a seal arrangement relative to the inside of the housing on the outer periphery of the pertinent end cap of the filter element, as is conventional in the prior art is unnecessary. Instead sealing is effected with a much smaller seal diameter. As a result, reduced mounting forces and simplification result in the installation and removal of filter elements.

Especially advantageously for forming the fluid path between the filtered side and the fluid outlet within the pipe connector, the end cap has an inner pipe body extending with its inlet end into the filter cavity forming the filtered side and being open on one outlet end to the connecting space located on the outside of the pipe connector.

For forming the other inner fluid path, the pipe connector of the end cap has a free lower end open to the water collecting space. Between the outside of the inner pipe body and the inside of the pipe connector, a free space forms this fluid path from the separation space to the water collecting space.

Especially advantageously, the pipe connector and the inner pipe body with their ends facing the interior of the filter element form respective concentric connecting rings. The outer ring projects into the separation space and on the outside adjoins the support tube of the filter medium. The inner ring projects into the inner filter cavity and on the outside adjoins the inside of a hydrophobic screen forming part of the water separation device and surrounding the filtered side.

Advantageously, the seal arrangements between the pipe connector of the end cap and through channel of the element retainer can in each instance be formed by O-rings sitting in the annular grooves of the pipe connector.

In an especially advantageous manner, an O-ring for sealing between the outlet end of the inner pipe body belonging to the filtered side and the water collecting space can be located near the lower free end of the pipe connector. An O-ring for sealing between the top of the intermediate bottom of the element retainer, which top belongs to the unfiltered side, and the filtered side on the pipe connector can be located above the outlet end of the inner pipe body.

With respect to the configuration of the inner pipe body in the pipe connector of the end cap, the inner pipe body can be shaped as a T-pipe. The axially extending inlet part discharges on the inner connecting ring passing into a transverse channel forming two outlet ends discharging on the outside of the pipe connector at two opposing points. The filter element can thus assume more than one rotational position in its operating position.

The invention also includes a filter element intended for use in such a filter according to the invention.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

The invention is explained below using the example of a fuel filter designed to clean diesel oil in a fuel supply system (not shown) of an internal combustion engine, which diesel oil is contaminated with certain water impurities. The invention is equally well suited for other types of fluids.

Figure 1:
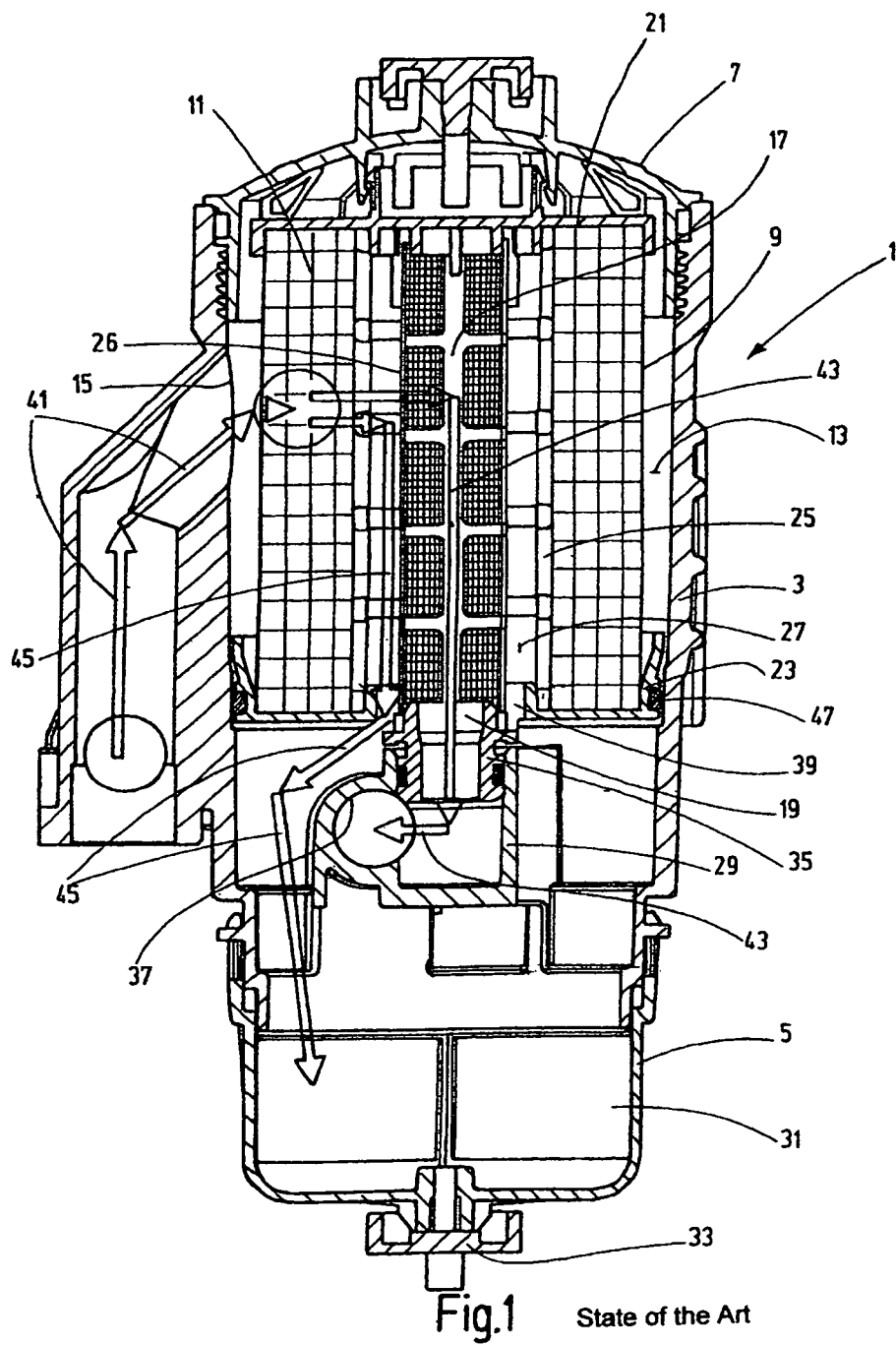
FIG. 1 is a side elevational view in section of a fuel filter provided with a water separation device according to the prior art.

The prior art device of FIG. 1 has a filter housing 1 with a hollow cylindrical main part 3 and a bottom part 5 adjoining its underside. On the upper end, a housing cover 7, which can be removed for installation and removal of a filter element 9, is screwed to the main part 3. Between the outside of the filter medium 11 of the filter element 9 held in the housing 1, which medium is formed by a filter mat, and the inside wall of the housing 1, an intermediate space in the filtration process forms the unfiltered side 13. The fuel to be cleaned can be supplied to the unfiltered side 13 via an inlet opening 15 and flows through the filter element 9 from the outside to the inside to an inner filter cavity 17 forming the filtered side 19 in the filtration process.

In the conventional manner in filter elements, end caps 21 and 23 form enclosures for the filter medium 11 on its ends, and a fluid-permeable support tube 25 resting against the interior of said filter medium. At a radial distance from the support tube 25, a hydrophobic screen 26 surrounds the inner filter cavity 17 in the form of a tube. To effect water separation, such fuel filters use a filter medium 11 that acts by coagulation for the water entrained by the fuel. Water precipitates in droplet form, remains in the intermediate space between support tube 25 and hydrophobic screen 26 and sinks since the screen 26 is impermeable to coagulated water droplets. The intermediate space therefore forms a water separation space 27 in which the separated water sinks toward the end cap 23.

With this lower end cap 23, the filter element 9 is secured on a housing-mounting element retainer 29 located above the bottom part 5 and forms a water collecting space 31 for discharging separated water via a water drain 33. For the interaction with the element retainer 29, the end cap 23 in the device corresponding to the prior art has a central pipe connector 35 providing a passage for the cleaned fuel that emerges from the filtered side 19, i.e., the inner filter cavity 17, and that travels to a fuel outlet 37 located in the element retainer 29 and from there to the outside of the housing 1. For the outflow of the separated water located in the separation space 27, in the end cap 23, a water passage 39 is formed that is open to the separation space 27 and that surrounds the pipe connector 35. Via water passage 39, the separated water travels directly along the outside of the element retainer 29 to the water collecting space 31. The corresponding flow conditions are illustrated in FIG. 1 by flow arrows. The arrows 41 illustrate the fuel inflow to the unfiltered side 13. The arrows 43 depict the flow of the cleaned diesel oil. The arrows 45 show the water flow. For sealing of the unfiltered side 13 located on the outside of the filter element 9 relative to the bottom-side water collecting space 31, a seal arrangement in the form of a gasket 47 seals against the inside of the filter housing on the outer periphery of the end cap 23.

The exemplary embodiment of the device according to the invention, explained using FIGS. 2 to 6, differs from the prior art device of FIG. 1 mainly by a special configuration of the end cap 23 assigned to the element retainer 29. The special construction of the element retainer 29 is adapted to retainer 29. In the prior art, the water passage 39 on the bottom of the separation space 27 is directly connected to the water collecting space 31 so that the separated water, see arrows 45 from FIG. 1, drains along the outside of the element retainer 29 to the collecting space 31. In the present invention, the pipe connector 35 of the end cap 23 forms not only a second fluid path 55 for the discharge of cleaned fuel from of the filtered side 19 of the filter element 9 and toward the fuel outlet 37, but the pipe connector 35, in addition to this second fluid inner path 55, also forms another or first inner fluid path 51 that is separate from the second fluid path 55 and that leads from the separation space 27 via the free lower end 53 of the pipe connector 35 to the water collecting space 31. This configuration of the first inner fluid path 51 for water and of the second inner fluid path 55 that is separate therefrom between the filtered side 19 and the fuel outlet 37 makes permits providing the element retainer 29 on an intermediate bottom 57 forming a central through channel 59 to the bottom-side water collecting space 31. The sealing device, which during the filtration process separates the unfiltered side 13 from the water collecting space 31, therefore need not be provided on the peripheral edge of the end cap 23, but can be provided between the pipe connector 35 and the element retainer 29 on the central through channel 59, that is, with an advantageously small seal diameter.

Figure 2:
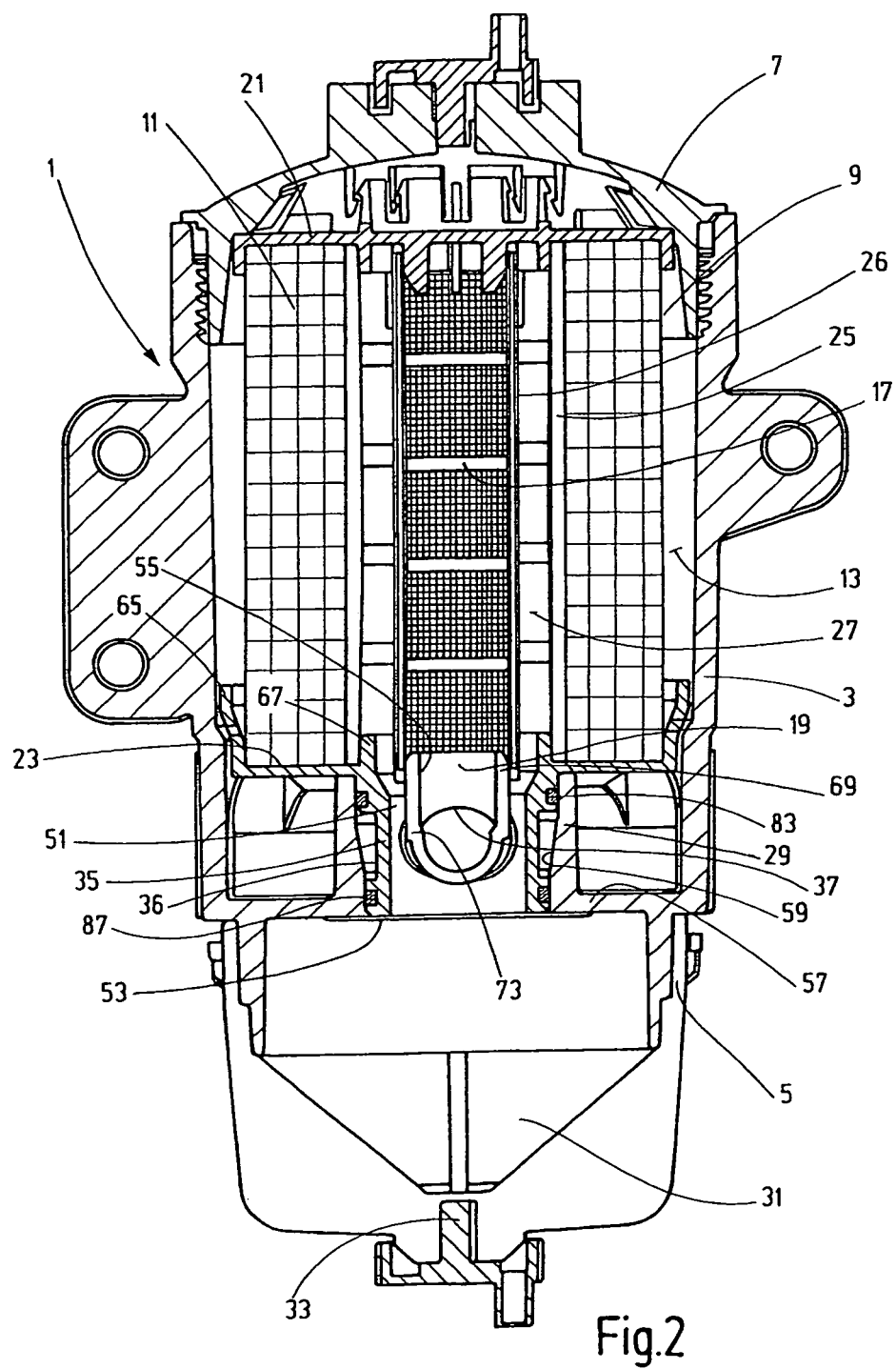
FIG. 2 is a side elevational view in section of a filter according to an exemplary embodiment of the invention.
Figure 3:
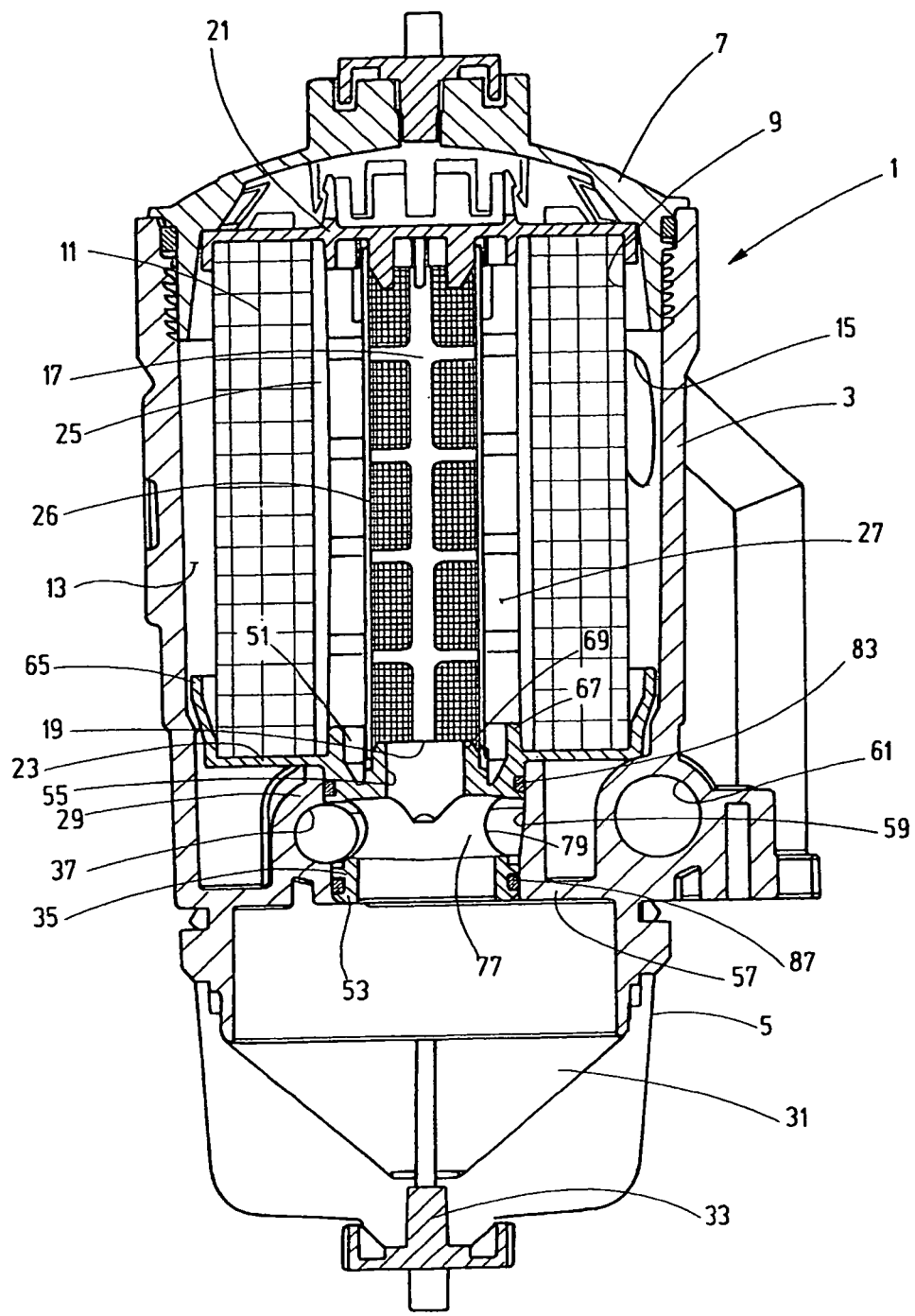
FIG. 3 is a side elevational view in section of the filter at FIG. 2, shown turned by 90° relative to FIG. 2.

FIGS. 2 and 3 show different positions of the filter housing 1. In FIG. 2, the inner fluid path 51 of the pipe connector 35 of the end cap 23 forms the drain path for discharge of the separated water from the separation space 27 to the water collecting space 31 and is clearly visible. In the representation of FIG. 3, which in contrast has been turned by 90°, the second fluid path 55, via which cleaned fuel emerging from the filtered side 19 of the inner cavity 17 of the filter element 9 flows to the fuel outlet 37 and from there emerges from the housing via an outlet 61, is more clearly apparent.

Figure 4:
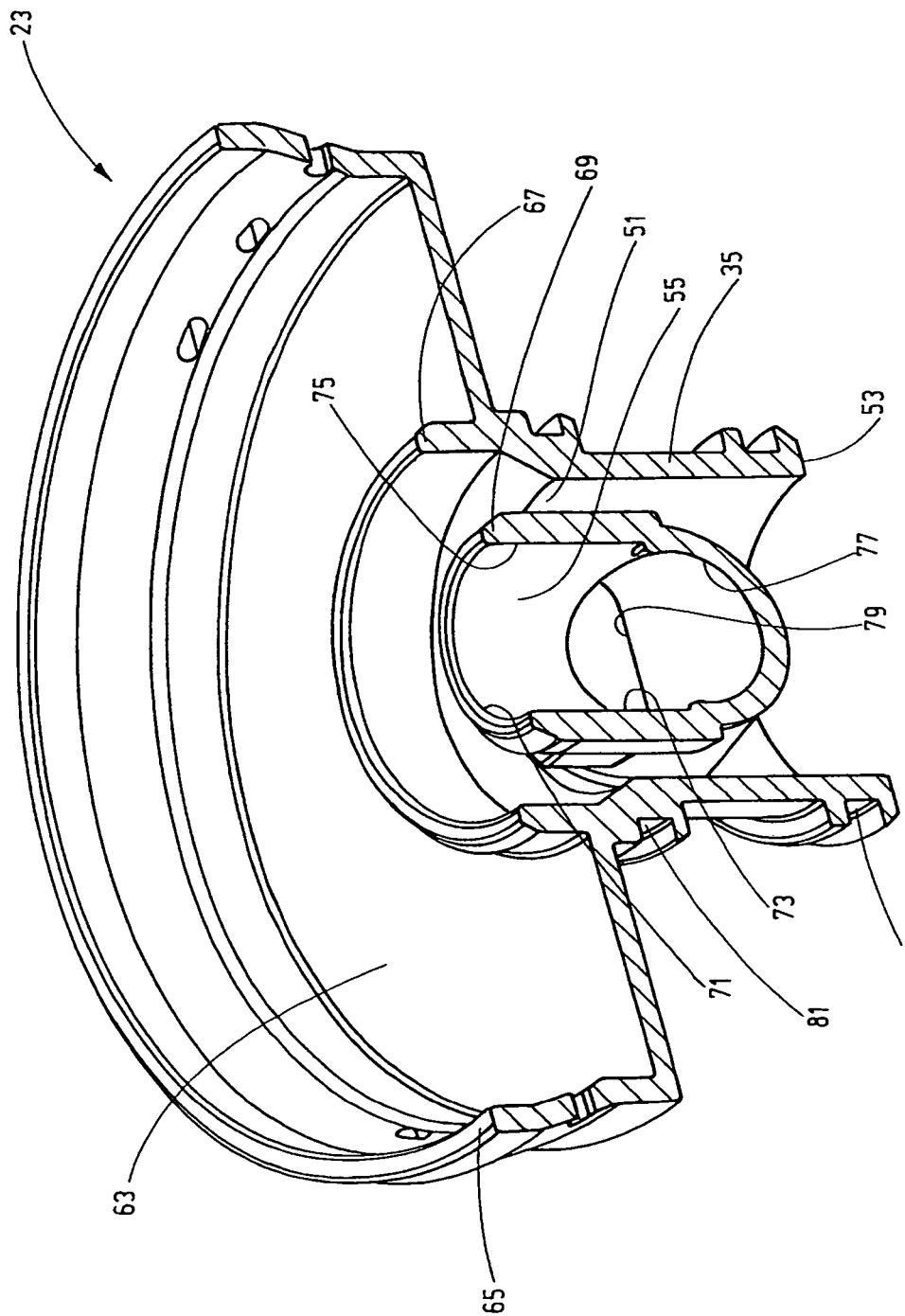
FIG. 4 is a perspective view in section of only one filter element end cap of FIG. 2 enlarged and cut in half compared to FIGS. 2 and 3.
Figure 5:
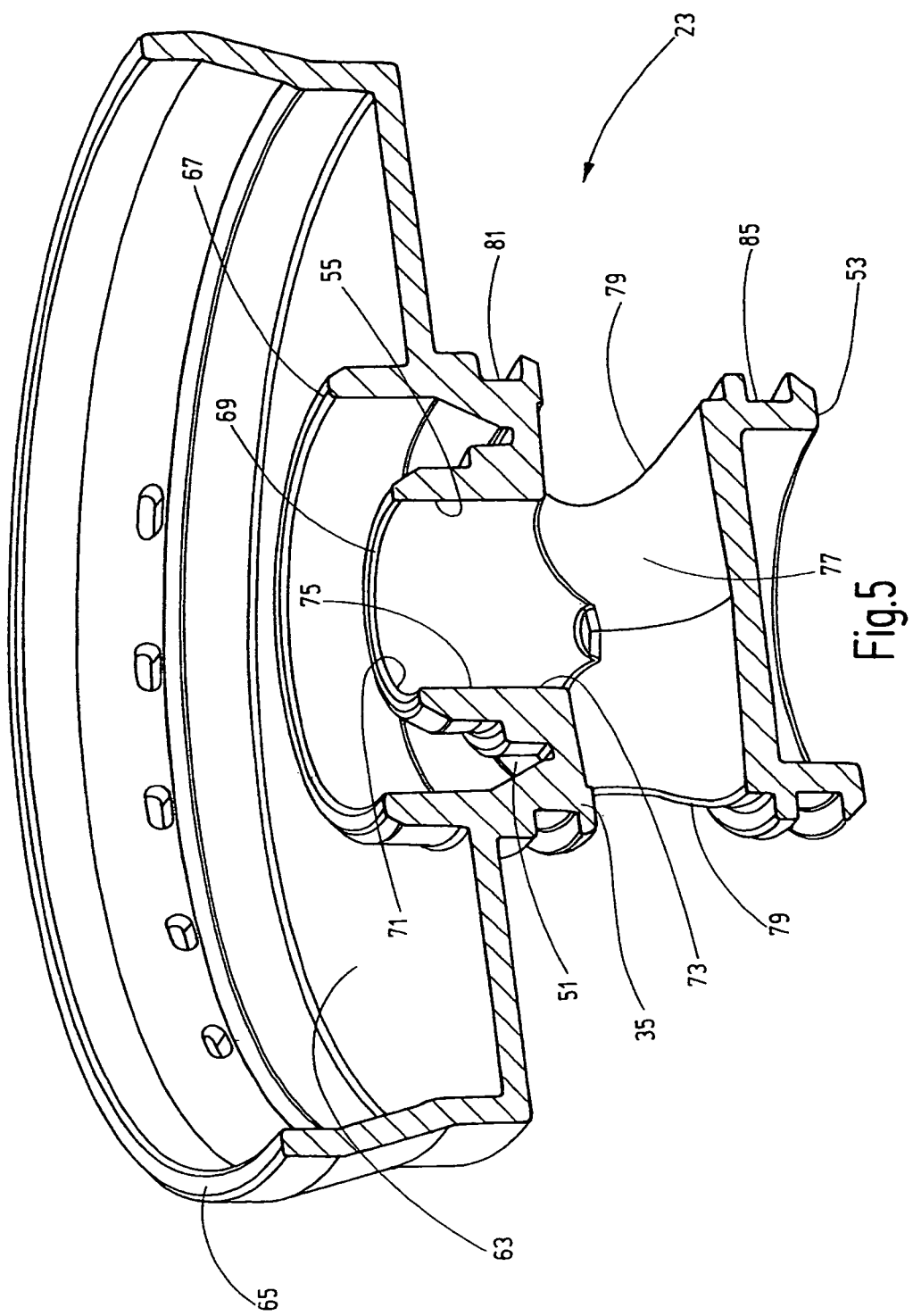
FIG. 5 is a perspective view in section of the end cap of FIG. 4 turned by 90° relative to FIG. 4.
Figure 6:
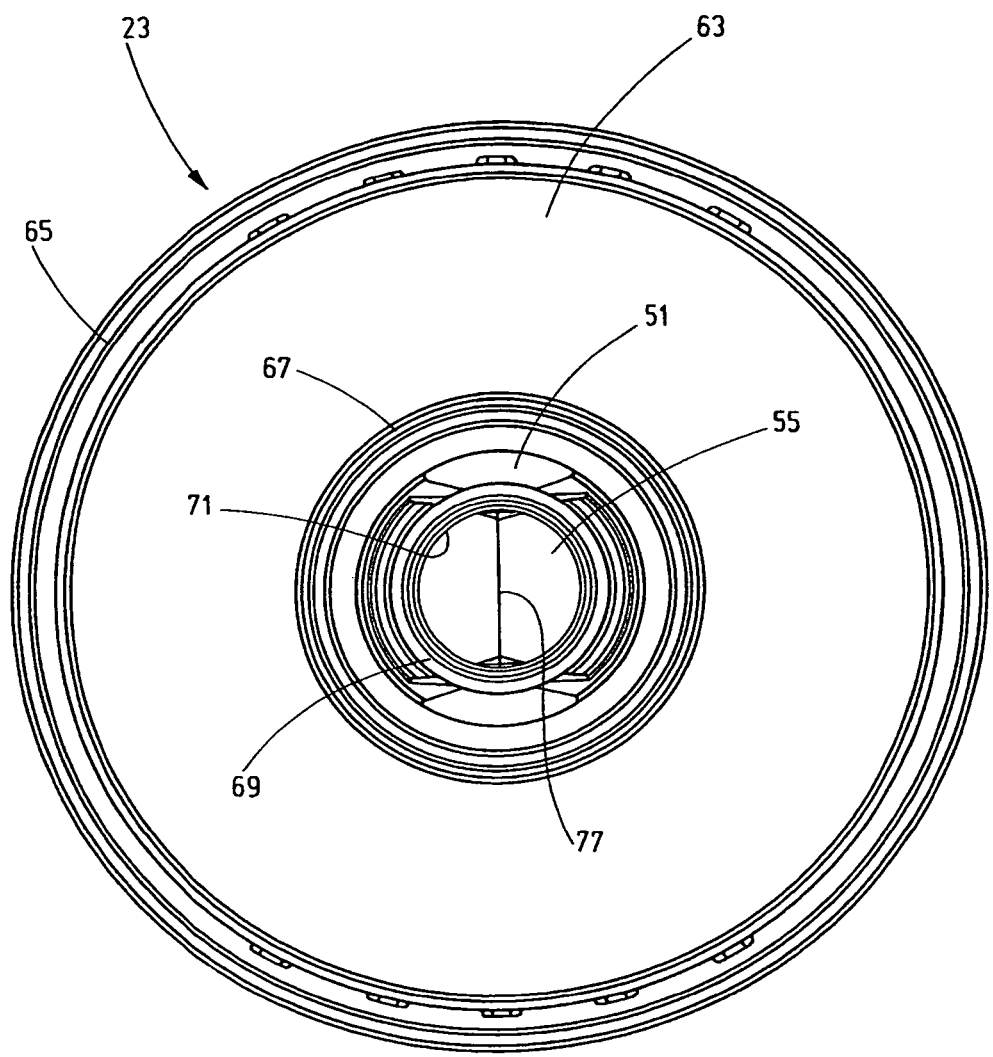
FIG. 6 is a top plan view of the end cap of FIG. 4 in the rotary position shown in FIG. 5.

FIGS. 4 to 6 show greater detail of the configuration of the end cap 23. As is conventional in such end caps, it is a one-piece injection molded part of plastic material with a peripheral edge 65 forming an outer enclosure of the filter element 9 and projecting out of a round, planar bottom surface 63. The central pipe connector 35 extends from the underside of the bottom surface 63 and on the top side of the bottom surface 63, undergoes transition into a connecting ring 67 projecting toward the top and having a somewhat greater diameter than the pipe connector 35 located on the underside. Within and concentric to the connecting ring 67, a second connecting ring 69 projects up over the plane of the bottom surface 63. This second ring 69 forms the inlet end 71 of an inner pipe body 73 located within the pipe connector 35. This pipe body 73 forms the inner fluid path 55 provided in the end cap 23 for the connection between the filtered side 19 and the fuel outlet 37. As FIGS. 2 and 3 show, the inner connecting ring 69 extends into the filter cavity 17 forming the filtered side 19, with the ring 69 on the outside adjoining the inside of the hydrophobic screen 26. The outer connecting ring 67 projects into the separation space 27 and on the outside adjoins the support tube 25 of the filter medium 11. As is most apparent from FIG. 4, along the inside of the ring 67 and along the outside of the inner pipe body 73, the fluid path 51 for the separated water that emerges on the lower end 53 of the pipe connector 35 is formed. The representation of FIG. 5, by contrast turned by 90°, shows the fluid path 55 more clearly for the cleaned fuel entering the pipe body 73 via the inlet end 71 and passing via an axially extending inlet part 75 in the form of a T-pipe into a transverse channel 77 forming two outlet ends 79 from which the fuel travels to the fuel outlet 37.

On the outer periphery of the pipe connector 35 between the outlet ends 79 and the bottom surface 63, an annular groove 81 receives an O-ring 83 for sealing between the top side of the intermediate bottom 57 of the element retainer 29, which top side belongs to the unfiltered side 13, and the filtered side 19. An annular groove 85 adjacent to the lower free end 53 forms the seat for an O-ring 87 for sealing between the outlet ends 79 of the pipe body 73, which ends belong to the filtered side 13, and the water collecting space 31. As is apparent from FIG. 2, between the O-rings 83, 87, between the outside of the pipe connector 35 and the inside of the through channel 59, a connecting space 36 is formed via which the cleaned fuel travels from the outlet ends 79 to the outlet 37 of the housing 1.

While various embodiments have been chosen to illustrate the invention, it will be understood by those skilled in the art that various changes and modifications can be made therein without departing from the scope of the invention as defined in the appended claims.

What is claimed is:

1. A filter for oil contaminated with water impurities, comprising:
    a filter housing having an element retainer forming a fluid outlet leading out of said filter housing and a water collecting space, said element retainer being located above said water collecting space, said water collecting space being located on a bottom of said filter housing;
    at least one filter element accommodated in said filter housing and having a filter medium with an outer unfiltered side and an inner filtered side, said inner filtered side defining an inner filter cavity, fluid to be filtered passing from said outer unfiltered side through said filter medium into said inner filter cavity;
    a water separation device and a separation space for separated water in said inner filter cavity;
    an end cap enclosing lower ends of said water separation device, said separation space and said filter medium, said end cap having a pipe connector forming inside thereof a fluid passage for filtered fluid emerging from said inner filter cavity to said fluid outlet and a water passage at least partially surrounding said fluid passage and being open to said separation space, said pipe connector being secured on said element retainer, said water passage forming a first fluid path separate from a second fluid path, said second fluid path connecting said inner filtered side of said filter element and said fluid outlet of said filter housing in an operating position of said filter element, said element retainer forming a through channel to said water collecting space; and
    first and second seals located between said through channel and said pipe connector of said end cap and on an outside of said pipe connector forming a collecting space connecting said second fluid path to said fluid outlet of said filter housing.

2. A filter according to claim 1 wherein
    said end cap comprises an inner pipe body extending with an inlet end thereof into said inner filter cavity and being open on an outlet end thereof to said collecting space located on said outside of said pipe connector.

3. A filter according to claim 2 wherein
    said pipe connector of said end cap comprises a lower end open to said water collecting space and comprises free space between an outside of said inner pipe body and an inside of said pipe connector forming said first fluid passage from said separation space to said water collecting space.

4. A filter according to claim 2 wherein
    said pipe connector and said inner pipe body comprise ends facing an interior of said filter element and forming concentric outer and inner connecting rings, respectively, said outer connecting ring projecting into said separation space and having an outside adjoining a support tube inside said filter medium of said filter element, said inner connecting ring projecting into said inner filter cavity and adjoining on an outside thereof an inside of a hydrophobic screen forming a part of said water separation device and surrounding said inner filtered side.

5. A filter according to claim 4 wherein
    said inner pipe body comprises a T-shaped pipe having an axially extending inlet part discharging on said inner connecting ring and passing into a transverse channel forming two outlet ends, said outlet ends discharging on an outside of said pipe connector at two opposing points into said connecting space.

6. A filter element according to claim 2 wherein
    said pipe connector and said inner pipe body comprise ends facing an interior of said filter medium and forming concentric outer and inner connecting rings, respectively, said outer connecting ring projecting into said separation space and having an outside adjoining a support tube inside said filter medium, said inner connecting ring projecting into said inner filter cavity and adjoining on an outside thereof an inside of a hydrophobic screen forming a part of said water separation device and surrounding said inner filtered side.

7. A filter element according to claim 6 wherein
    said inner pipe body comprises a T-shaped pipe having an axially extending inlet part discharging on said inner connecting ring and passing into a transverse channel forming two outlet ends, said outlet ends discharging on an outside of said pipe connector at two opposing points.

8. A filter according to claim 1 wherein
    said first and second seals comprise first and second O-rings, respectively, received in first and second annular grooves, respectively, of said pipe connector.

9. A filter according to claim 8 wherein
    said end cap comprises an inner pipe body extending with an inlet end thereof into said inner filter cavity and being open on an outlet end thereof to said collecting space located on said outside of said pipe connector;
    said second O-ring seals between an outlet end of said inner pipe body and said water collecting space and is located near a lower free end of said pipe connector; and
    said first O-ring seals a top side of an intermediate bottom of said element retainer and a filtered side on said pipe connector and is located above said outlet end of said inner pipe body, said top side being on said outer unfiltered side.

10. A filter element according to claim 8 wherein
said end cap comprises an inner pipe body extending with an inlet end thereof into said inner filter cavity and being open on an outlet end thereof to said collecting space located on said outside of said pipe connector;
said second O-ring seals an outlet end of said inner pipe body and is located near a lower free end of said pipe connector; and
said first O-ring seals a filtered side on said pipe connector and is located above said outlet end of said inner pipe body, said top side being on said outer unfiltered side.

11. A filter element for oil contaminated with water impurities, comprising:
a filter medium with an outer unfiltered side and an inner filtered side, said inner filtered side defining an inner filter cavity, fluid to be filtered passing from said outer unfiltered side through said filter medium into said inner filter cavity;
a water separation device and a separation space for separated water in said inner filter cavity;
an end cap enclosing lower ends of said water separation device, said separation space and said filter medium, said end cap having a pipe connector forming inside thereof a fluid passage for filtered fluid emerging from said inner filter cavity and a water passage at least partially surrounding said fluid passage and being open to said separation space, said pipe connector being securable on an element retainer located above a water collecting space in a filter housing, said water passage forming a first fluid path separate from a second fluid path, said second fluid path connecting said inner filtered side of said filter element and a fluid outlet of the filter housing in an operating position of said filter element.

12. A filter element according to claim 11 wherein
a first seal and a second seals are located on an outside of said pipe connector forming a collecting space for connecting said second fluid path to the fluid outlet of the filter housing.

13. A filter element according to claim 12 wherein
said first and second seals comprise first and second O-rings, respectively, received in first and second annual grooves, respectively, of said pipe connector.

14. A filter element according to claim 12 wherein
said end cap comprises an inner pipe body extending with an inlet end thereof into said inner filter cavity and being open on an outlet end thereof to said collecting space located on said outside of said pipe connector.

15. A filter element according to claim 14 wherein
said pipe connector of said end cap comprises a lower end that can open to the water collecting space and comprises free space between an outside of said inner pipe body and an inside of said pipe connector forming said first fluid passage from said separation space to the water collecting space.

* * * * *